Sept. 30, 1952

G. J. F. LEITL 2,611,941

APPARATUS FOR THE EXTRUSION MOLDING OF CONCRETE AND LIKE MATERIALS

Filed Nov. 25, 1949

INVENTOR:
George J.F.Leitl,

By

ATTORNEY

Sept. 30, 1952 G. J. F. LEITL 2,611,941
APPARATUS FOR THE EXTRUSION MOLDING
OF CONCRETE AND LIKE MATERIALS
Filed Nov. 25, 1949 3 Sheets-Sheet 2

INVENTOR:
George J. F. Leitl,
By
ATTORNEY

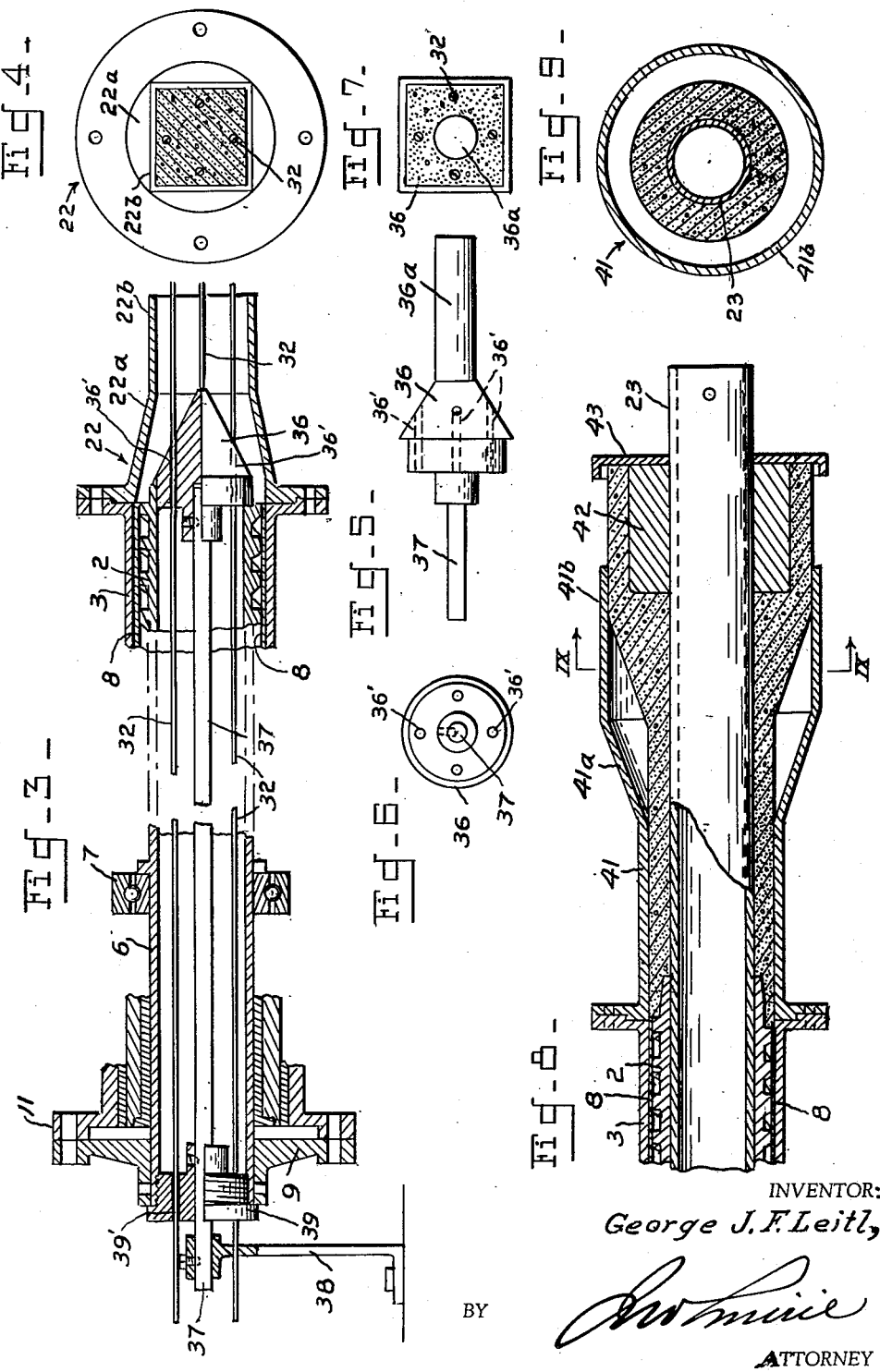

Patented Sept. 30, 1952

2,611,941

UNITED STATES PATENT OFFICE 2,611,941

APPARATUS FOR THE EXTRUSION MOLDING OF CONCRETE AND LIKE MATERIALS

George Johann Felix Leitl, Port Melbourne, Victoria, Australia

Application November 25, 1949, Serial No. 129,215
In Switzerland November 29, 1948

7 Claims. (Cl. 25—14)

This invention relates to the extrusion moulding of articles such as pipes, beams, lintels, kerbs, slabs, blocks and so on, either of solid, hollow or multi-cored cross section, from cementitious materials, especially from mixtures of Portland cement concrete.

An object of the invention is to provide improved apparatus for carrying out such process in a most expeditious and efficient manner, thereby assuring highly satisfactory products at minimum cost.

According to the invention, the concrete or like mixture is extruded through a nozzle or die member by means of an Archimedean screw of the square thread type operating within an annular passage into which the material is fed, and provision is made to restrain any substantial circumferential or helical movement of the material with the result that it is forced directly forwards under compression from the screw. The nozzle or die at the outlet end of the annular passage may be tapered so that the material forced therethrough by the screw is subject to further compression and is eventually extruded from the die or nozzle in finally moulded shape.

It is preferred that the material be fed from a hopper to the annular passage and the rear end of the screw through a forwardly tapering annular passage by means of vanes or impellers which rotate with the screw, but, here again, circumferential or helical movement of the material is restrained so that it is forced directly forwards under pressure from the impellers. Where such feed arrangements are employed, it will be apparent that the material is subjected to three distinct stages of compression while it is being forced forwards in a substantially straight path from the feed hopper to the discharge end of the reducing nozzle.

With this invention, it becomes possible to utilize a concrete mixture having a low water/cement ratio and thus avoid the problems of getting rid of excess water, which arise where a relatively wet mix is employed. Furthermore, the moulded objects will be of the utmost density and strength.

Certain embodiments of the invention will now be described with reference to the accompanying drawings, in which—

Figure 3 is a sectional elevation of the major components of an apparatus similar to Figure 1 but adapted for the extrusion moulding of articles of solid cross section. In this view, the hopper, feed device, driving mechanism and certain structural parts as shown in Figure 1 have been omitted.

Figure 4 is a view looking on the right hand end of Figure 3 and indicating a typical form of solid article produced thereby.

Figure 5 is a side elevation of a core member, such as may be used in place of the plug seen in Figure 3, when it is desired to produce hollow objects.

Figure 6 is a view looking on the left hand end of Figure 5.

Figure 7 is a view looking on the right hand end of Figure 5.

Figure 8 is a fragmentary view of the outer end of an apparatus as in Figure 1 but adapted for the moulding of faucets or bell mouthed formations at the one ends of the moulded articles.

Figure 9 is a cross section on line IX—IX of Figure 8.

Figure 1:
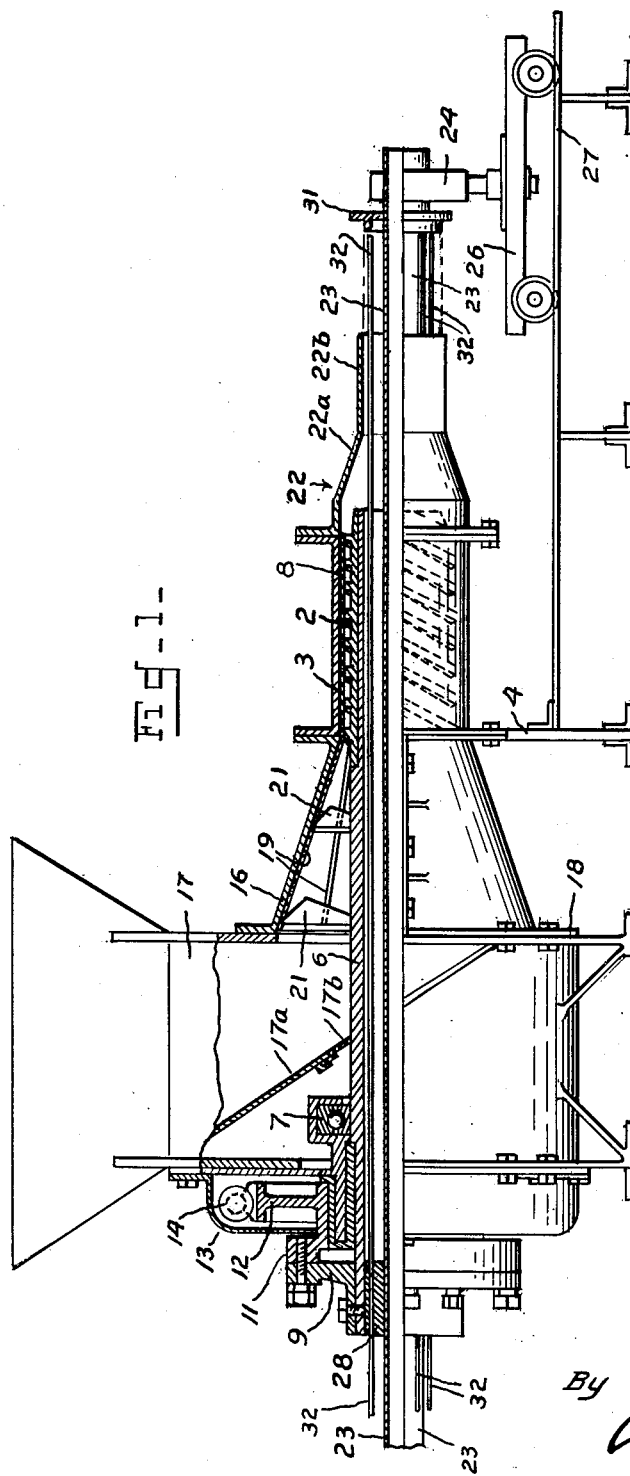
Figure 1 is a side view of the apparatus with the lower part in elevation and the upper part in section.

Referring more especially to Figure 1, an Archimedean screw 2 is shown extending concentrically within a cylindrical housing 3 supported in a horizontal attitude or position by a base structure 4. The screw is advantageously of the square thread type and preferably of multi-start formation having, for example, three threads. As it will probably be desirable to replace this screw from time to time to compensate for wear that is almost bound to occur, it is preferably detachably secured to or on a reduced front end portion of an elongated tubular shaft or tube 6 which may be journalled in a bearing 7 near one end of the tube. The other end of this tube and the screw 2 are maintained in operative position by the outer periphery of the threads of the screw being contiguous or making close contact with a series of baffles or ribs 8 (best seen in Figure 2) which extend lengthwise along the inner surface of housing 3 at circumferentially spaced intervals. Four of such ribs may be provided at equi-distant intervals.

The tube 6 and the screw 2 thereon are adapted to be rotated at a suitable speed (ranging, say, from 150 to 250 R. P. M.) and, for this purpose, the rear end of the tube 6 or reduced portion thereof, may have secured thereon a drive spider 9 which is attached to a flange 11 of a worm wheel 12 revoluble about an outer extension sleeve of bearing 7 and reduced rear end of tube 6, disposed within a casing 13 and meshed by a worm 14 on a driving shaft operated from a suitable source of power.

That portion of tube 6 between housing 3 and bearing 7 extends through a feed housing 16 and a hopper 17 supported by a base structure such as 18 which also supports the bearing 7 and the driving mechanism 12, 13 and 14. The rear wall 17a of the hopper is inclined forwardly towards the lower and larger end of the feed housing 16 and may have an inset apertured rubber or like pad 17b to provide a sealed passage for tube 6.

The feed housing 16 is tapered so as to progressively decrease in cross section towards the screw housing 3 and is provided at circumferential intervals on its inner surface with a series of longitudinally extending ribs 19 which may be continuous with and serve a purpose similar to the ribs 8 of the screw housing 3.

Figure 2:
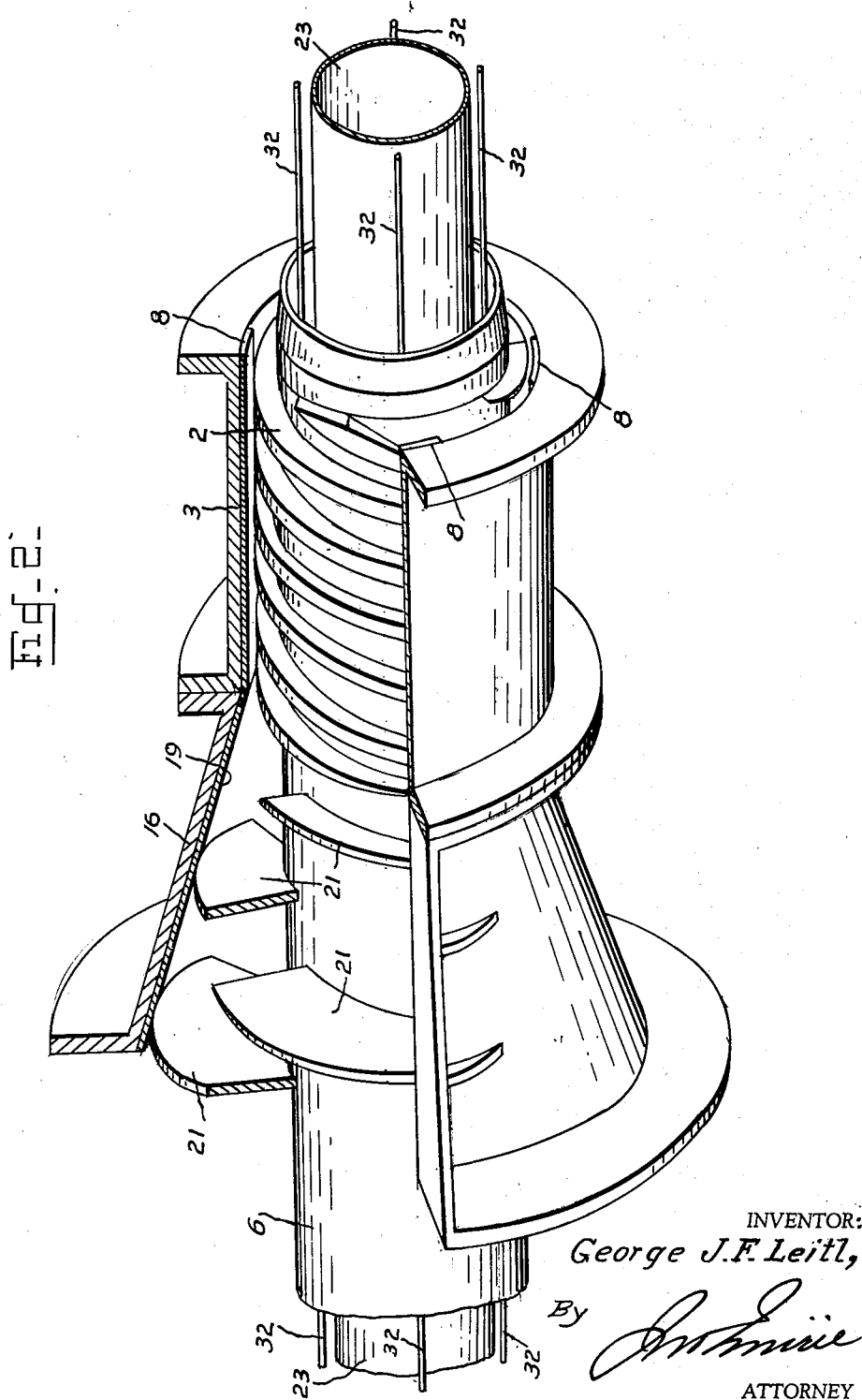
Figure 2 is a perspective view, partly in section, showing the feed device, the Archimedean screw and the surrounding housings.

That portion of tube 6 within feed housing 16 has secured thereto at longitudinally spaced positions staggered or otherwise related, a series of inclined vanes or impeller blades 21 and which, as best seen in Figure 2, should be of the same angle and pitch as the threads or helices of the screw 2. The outer peripheral edges of these inclined vanes are adapted to make close contact with the ribs 19.

Projecting forwardly from the outer end of screw housing 3 is an extrusion die or nozzle 22, an intermediate portion 22a of which is tapered or progressively reduced in diameter and merges into an outer end portion 22b of uniform or constant diameter. This die or nozzle is concentric with the screw 2 and its housing 3 and tube 6.

Extending freely and concentrically within tube 6 is a core member 23 shown tubular and which projects forwardly beyond nozzle 22 and may be connected to a bracket 24 upstanding from a trolley 26 suitably driven or advanced and adapted to track along rails 27 laid parallel to the axis of screw 2 and tube 6. The core member may be supported at or near its other end by a sleeve 28 concentrically disposed within tube 6.

Operation of the apparatus as previously referred to is as follows: The concrete or like mixture from hopper 17 is fed forwardly through the progressively reduced annular passage formed between tapered feed housing 16 and the adjacent portion of tube 6 by the rotating vanes or impeller blades 21. The ribs 19 prevent any substantial circumferential movement of the material so that it is constrained to travel directly forwards during which it receives initial compression. Upon entering the annular passage existing between the screw 2 and its housing 3, the material is subjected to further compression as it continues to be forced forwardly by the screw. Here again, the material is prevented from any pronounced circumferential or helical movement by the ribs 8. As the material passes out of the screw housing 3 under pressure from the screw, it is subjected to a further stage of compression in the annular space between the core member 23 and the tapered part 22a of nozzle 22. By moving the core member 23 forwardly at an appropriate speed with and on the trolley 26, the extruded hollow body is supported thereon until it has set sufficiently to be withdrawn lengthwise.

Prior to commencement of operations, a ring 31 encircling the core member 23 may be resiliently pressed against the outer end of nozzle 22 so that it will recede therefrom after sufficient pressure has been built up by the oncoming extruded material and thereafter travel forwardly at the leading end of the extruded moulding. The inner face of this ring may be shaped so as to impart a desired profile to the leading end of the moulded object.

Any suitable provision may be made for severing the extruded moulding into required lengths either manually or mechanically but such means do not form any part of the present invention.

The embodiment of Figure 1 is particularly applicable to the manufacture of concrete pipe, and, in cases where reinforced pipe is required, reinforcing rods 32 may be introduced into the annular space between the core member 23 and housing tube 3. As the concrete material is forced through the tapered nozzle 22 and uniform portion 22b thereof, the reinforcing rods become embedded in the extruded body and are drawn forwardly therewith.

Where it is desired to produce moulded bodies of solid cross section, the forward end of tube 6 may be closed by a tapered plug 36 as seen in Figure 3, such plug being mounted upon a rod 37 constituting an axial member replacing axial tubular core member 23 and which extends concentrically within the tube 6 and is secured at its rear end to a bracket 38. Near this rear end the rod 37 may have secured thereto a sleeve or collar 39 which supports the drive spider 9 and the rear end of tube 6. This collar 39 and the tapered plug 36 at the other end of the rod 37 may be provided with co-aligned through passages 39' and 36' respectively to serve as guides and supports for the reinforcing rods 32.

The modification illustrated in Figures 3 and 4 may be adopted where it is desired to produce hollow bodies of square or like profile; according thereto the tapered plug 36 has a forwardly extending section 36a of constant diameter which determines the size and shape of the passage to be formed in the moulded body.

Bodies such, for instance, as pipes which require to be provided at one end with bell formations or faucets may be produced with the aid of the modification illustrated in Figures 8 and 9, according to which a mould member 41 is secured to and projects forwardly from the screw housing 3 (or, in the case of reinforced pipes, the outer end of nozzle 22) and has its outer end portion flared as at 41a according to the shape of the faucets to be produced.

In order to produce the desired cavity within the flared end 41a of the faucet, an annular plug 42 is mounted around the core member 23 (which, in this instance, can be a close sliding fit within the screw 2 and tube 6) and has a closing ring 43 at its outer end. At the commencement of moulding operations, the ring 43 is resiliently held against the extreme outer end of the mould member 41, with the annular plug 42 projecting into the faucet moulding space, by suitable spring means which are not illustrated. The spring pressure should be sufficient to maintain the plug and closing ring in the moulding position until after the moulding space is completely filled with the concrete mixture under pressure, whereupon the influence of the spring is overcome and normal extrusion is allowed to proceed. Figure 8 illustrates that stage of manufacture shortly after the faucet end has been moulded and is moving out of the flared or bell-mouth portion 41a and uniformly enlarged end portion 41b. During the remainder of the extrusion action, the annular plug 42 and the ring 43 move lengthwise with the core member 23 and the moulded pipe.

Having now described my invention, what I claim as new and desire to secure by Letters Patent is:

1. In apparatus for the extrusion moulding of concrete and like materials, an Archimedean screw of the square thread type, a tube with a smooth peripheral portion extending lengthwise of and abutting the screw, a cylindrical housing encircling said screw and forming an annular passage for the material, means for feeding the material into one end of said annular passage, a nozzle at the other end of said passage, means for rotating said screw and tube, and a series of ribs extending lengthwise at circumferential intervals on the inner surface of said housing, the inner surfaces of said ribs being contiguous with the outer periphery of the screw so that circumferential movement of the material within said annular passage is restrained by said ribs whereby the material is forced directly forwards by the screw towards said nozzle.

2. In apparatus for the extrusion moulding of concrete and like material, the combination claimed in claim 1, wherein said screw is of hollow form and wherein an axial member extends concentrically within and through said hollow screw whereby material forced by said screw through the nozzle is moulded within the nozzle in the form of a hollow body, said axial member adapted to be moved forwardly at a rate corresponding with the rate of extrusion of the material from said nozzle.

3. In apparatus for the extrusion moulding of concrete and like material, the combination claimed in claim 1, wherein said screw is of hollow form and wherein an axial member extends concentrically within and through said hollow screw whereby material forced by said screw through the nozzle is moulded within the nozzle in the form of a hollow body, said axial member being supported at its opposite ends including a guided carriage at its forward end and moved forwardly at a rate corresponding with the rate of extrusion of the material from said nozzle.

4. In apparatus for the extrusion moulding of concrete and like material, the combination claimed in claim 1, wherein said screw is of hollow form and has a tubular portion with a smooth periphery and bore, extending rearwardly thereof and wherein an axial member extends concentrically within and through said hollow screw closes and is held at the front end of the screw and rear end of the tubular portion whereby material forced by said screw through the nozzle is moulded within the nozzle in the form of a solid body.

5. In apparatus for the extrusion moulding of concrete and like material, the combination claimed in claim 1, wherein said screw is of hollow form and wherein an axial member extends concentrically within and through said hollow screw whereby material forced by said screw through the nozzle is moulded within the nozzle in the form of a solid body, said axial member being supported at its opposite ends in fixed relation to the opposite ends of the hollow screw, closes the front end of the bore of the hollow screw and is tapered forwardly of the front end of the screw.

6. In apparatus for the extrusion moulding of concrete and like material, the combination claimed in claim 1, wherein said screw is of hollow form and wherein an axial member extends concentrically within and through said hollow screw whereby material forced by said screw through the nozzle is moulded within the nozzle in the form of a hollow body, said core member being fixed to said hollow screw and having a forwardly tapered portion at the front end of the screw bore and a portion of uniform cross-section in front of the tapered portion and extending through the nozzle.

7. In apparatus for the extrusion moulding of concrete and like materials, an Archimedean screw of hollow form and of the square thread type, a cylindrical housing encircling said screw and forming an annular space for the material, means surrounding said tubular extension for feeding the material into one end of said annular space, a nozzle at the other end of said space, means for rotating said screw, a series of flat ribs extending lengthwise at spaced circumferential intervals on the inner surface of said housing, the inner surfaces of said ribs being contiguous with the outer periphery of the screw so that circumferential movement of the material within said annular space is restrained by said ribs whereby the material is forced directly forward by the screw toward said nozzle, and means within the housing and screw at opposite ends thereof only for supporting and guiding therein longitudinally extending reinforcing rods so that they project into said nozzle and become progressively embedded in and moved synchronously with the moulded body as it is being extruded through said nozzle.

GEORGE JOHANN FELIX LEITL.

REFERENCES CITED

The following references are of record in the file of this patent:

UNITED STATES PATENTS

| Number | Name | Date |
| --- | --- | --- |
| 1,445,724 | Skorkovsky | Feb. 20, 1923 |
| 1,815,809 | Steele | July 21, 1931 |
| 1,858,956 | Hepperle | May 17, 1932 |